United States Patent
Eichhammer et al.

(10) Patent No.: US 9,545,698 B2
(45) Date of Patent: Jan. 17, 2017

(54) CONTAINER TREATMENT MACHINE

(71) Applicant: KRONES AG, Neutraubling (DE)

(72) Inventors: Tobias Eichhammer, Bad Abbach (DE); Dieter Hafner, Regensburg (DE)

(73) Assignee: KRONES AG, Neutraubling (DE)

( * ) Notice: Subject to any disclaimer, the term of this patent is extended or adjusted under 35 U.S.C. 154(b) by 324 days.

(21) Appl. No.: 14/173,951

(22) Filed: Feb. 6, 2014

(65) Prior Publication Data
US 2014/0306391 A1    Oct. 16, 2014

(30) Foreign Application Priority Data
Apr. 15, 2013    (DE) .................. 10 2013 206 679

(51) Int. Cl.
*B23Q 3/02*      (2006.01)
*B65C 9/00*      (2006.01)
(Continued)

(52) U.S. Cl.
CPC . *B23Q 3/02* (2013.01); *B65C 9/00* (2013.01); *B65C 9/40* (2013.01); *B67C 3/22* (2013.01); *F16P 1/02* (2013.01)

(58) Field of Classification Search
CPC .................. F16P 1/02; F16P 3/02; F16P 3/08; B65C 9/02; B65C 9/00; B65C 9/04; B65C 3/22; B65B 57/00; B65B 21/00; B67C 9/02; B67C 3/00; B23Q 11/06; B23Q 11/0825; B23Q 11/088; B23Q 11/00
(Continued)

(56) References Cited

U.S. PATENT DOCUMENTS 2,798,246 A * 7/1957 Holloway ............... E05D 15/26
                                                16/95 R
3,988,980 A * 11/1976 Walker ...................... F16P 1/00
                                                100/349
(Continued)

FOREIGN PATENT DOCUMENTS

CN      201864100 U     6/2011
CN      102341637 A     2/2012
(Continued)

OTHER PUBLICATIONS

Experience flexible, pressure-sensitive and cold glue labelling options in one solution; Sidel Co.*
(Continued)

*Primary Examiner* — Monica Carter
*Assistant Examiner* — Mahdi H Nejad
(74) *Attorney, Agent, or Firm* — Marshall, Gerstein & Borun LLP (57) ABSTRACT

A treatment machine for containers, in particular bottles, having a rotatable container table; a lift guard cover formed laterally on the container table; and a rail guide, which is stationarily fixed in position above the container table and which has the lift guard cover secured thereto such that it is displaceable in a vertical direction. The lift guard cover includes a carrier for fastening to the rail guide, the carrier extending in a circumferential direction. The lift guard cover can be mounted in a suspended fashion. Access to the container table in the raised condition of the lift guard cover is not impaired by guide rails extending down to the container table.

13 Claims, 5 Drawing Sheets

(51) Int. Cl.
  *F16P 1/02* (2006.01)
  *B67C 3/22* (2006.01)
  *B65C 9/40* (2006.01)

(58) Field of Classification Search
  USPC ..... 269/57; 100/349, 345; 74/608, 612–616; 409/134, 137; 160/122, 111, 108, 123, 160/202, 222, 223
  See application file for complete search history.

(56) References Cited

U.S. PATENT DOCUMENTS

| | | | | |
|---|---|---|---|---|
| 6,530,313 | B1 * | 3/2003 | Sugawara | B30B 15/287 100/349 |
| 6,987,241 | B2 * | 1/2006 | Hacker | B23Q 11/0825 160/222 |
| 7,992,598 | B2 * | 8/2011 | Elgan | B65D 19/08 141/10 |
| 8,272,179 | B2 * | 9/2012 | Mangelsen | B25J 19/06 52/239 |
| 9,003,704 | B2 * | 4/2015 | Giuliani | B65C 9/00 414/348 |
| 9,022,092 | B2 * | 5/2015 | Yamasaki | B23H 7/36 160/202 |
| 2004/0261889 | A1 * | 12/2004 | Elgan | B65D 77/061 141/10 |
| 2006/0185160 | A1 * | 8/2006 | Arb | B65B 65/00 29/771 |
| 2009/0145030 | A1 * | 6/2009 | Landerer | B23Q 11/0891 49/41 |
| 2012/0039692 | A1 * | 2/2012 | Giuliani | B65C 9/00 414/222.01 |
| 2013/0056148 | A1 * | 3/2013 | Zoni | B65C 9/40 156/280 |
| 2014/0306392 | A1 * | 10/2014 | Hafner | B65C 9/00 269/57 |
| 2014/0306393 | A1 * | 10/2014 | Hafner | B65C 9/00 269/57 |

FOREIGN PATENT DOCUMENTS

| | | | |
|---|---|---|---|
| CN | 202508344 U | | 10/2012 |
| CN | 103003160 A | | 3/2013 |
| CZ | 202013103477 U1 | * | 8/2013 |
| DE | 102012003353 A1 | * | 10/2012 |
| EP | 2560885 B1 | * | 6/2011 |
| EP | 2792927 A1 | * | 1/2014 |
| EP | 2792604 A | * | 10/2014 |
| ES | 2486322 T3 | * | 6/2011 |
| GB | 191226910 A | | 0/1913 |
| GB | 139033 A | * | 3/1919 |
| GB | 574285 A | * | 1/1944 |
| WO | WO2010-099822 | * | 9/2010 |
| WO | WO-2010099822 A1 | | 9/2010 |
| WO | WO201300155 A1 | * | 1/2013 |
| WO | WO2013001551 A1 | * | 1/2013 |
| WO | WO-2013001551 A1 | | 1/2013 |

OTHER PUBLICATIONS

A wide range of technologies for all types of packaging; Sidel Labeling (safety guards in p. 23); 2012.*
Packaging Europe News—Sidel's new SL 90_all the advantages of a modular I (Sidel).*
sidel_labelling_solutions_brochure_en; sidel.com/labelling; p. 24 (safety guards).*
Search Report for DE 10 2013 206 679.1, dated Nov. 21, 2013.
Search Report for EP 14 15 0011, European Patent Office, dated Aug. 15, 2014.
Office Action, Chinese patent application No. 201410076512.6, mailing date Feb. 3, 2016.

* cited by examiner

CONTAINER TREATMENT MACHINE

CROSS-REFERENCE TO RELATED APPLICATION

The present application claims the benefit of priority of German Application No. 10 2013 206 679.1, filed Apr. 15, 2013. The priority application is incorporated herein by reference in its entirety.

FIELD OF THE DISCLOSURE

The disclosure relates to a treatment machine for containers, in particular bottles.

BACKGROUND

Treatment machines with rotating container tables are, as is generally known, protected by a lateral lift guard cover during operation so as to prevent the fast rotating container stations from being accessed by hand. In known treatment machines the lift guard cover normally consists of planar screens and has, when seen from above, a substantially polygonal shape. The screens are then guided at the vertical edges of the polygon in stationary rails or the like and can be pushed upwards in said rails so as to allow lateral access to the container table for the purpose of cleaning, retooling or similar maintenance measures. The guide rails extend here continuously from a non-rotatable frame above the container table to a non-rotatable lower frame of the treatment machine. However, lateral access to the container table is limited by these stationary components of the lift guard also in the raised condition of the lift guard, so are the possible positions for docking treatment units along the machine circumference.

It would, however, be desirable to allow unhindered access to the container table throughout the largest possible angular area of the machine and/or to improve the flexibility with respect to possible docking positions for treatment units.

SUMMARY OF THE DISCLOSURE

The presently disclosed treatment machine includes: a rotatable container table; a lift guard cover formed laterally on the container table; and a rail guide, which is stationarily fixed in position above the container table and which has the lift guard cover secured thereto such that it is displaceable in a vertical direction. According to the present disclosure, the lift guard cover includes a carrier for fastening to the rail guide, the carrier extending in a circumferential direction. The carrier is in particular configured for mounting protection screens in a suspended fashion. The lift guard cover can be formed below the carrier without any stationary supports. This facilitates access to the container table in the raised condition of the lift guard cover and docking along the machine circumference. The rail guide formed above container table allows the lift guard cover to be mounted on the carrier in a suspended fashion. The carrier has e.g. a substantially rectangular cross-section. Along the carrier, e.g. fastening grooves or fastening ridges are formed.

Preferably, the rail guide comprises guide rails with downwardly projecting free ends. The freely projecting guide rails are then, by definition, not connected to a stationary frame at their lower ends. In other words, the mobile fastening elements for the lift guard cover can be displaced on the guide rails down to a point located beyond the lowermost fastening point of the guide rails. Due to the fact that the guide rail projects freely, the lift guard cover can be displaced upwards on the guide rail such that, in a raised position of the lift guard cover, the guide rail will not project beyond the lower edge of the lift guard cover. Hence, the accessibility of the container table in the area directly below the guide rail will not be impaired by the guide rail.

Preferably, the carrier, and in particular the contour of the lift guard cover in its entirety, are configured as a circular arc or a circular ring segment when seen from above, the circular arc or circular ring segment enclosing in particular a machine angle of at least 180°. In contrast to a carrier which is polygonal in shape when seen from above, circular arcs allow a flexible arrangement of protection screens at freely selectable machine angle positions. Therefore, the lift guard cover can be adapted to different production requirements, such as docking of various treatment units, in a comparatively large angular area of the machine.

Preferably, the lift guard cover comprises protection screens projecting downwards beyond the carrier. Openings for the docking of different treatment units can thus be formed in a flexible manner on the lift guard cover.

Preferably, the carrier comprises at least one circumferentially extending fastening profile, in particular a fastening profile configured as a groove. Fastening elements, e.g. clamps, for protection screens can thus be mounted more easily. In particular, a circumferentially continuously extending fastening profile allows protection screens and fastening elements to be positioned in freely selectable sections along the carrier.

A particularly advantageous embodiment of the treatment machine according to the present disclosure further comprises holding rods having a first end configured for suspended fastening to the carrier and a second end configured for supporting protection screens thereon. The holding rods allow a modular construction of the lift guard cover consisting of a plurality of circumferential cover segments. For example, protection screens adjoining one another in a circumferential direction may be fixed between two respective holding rods. The protection screens may be fixed to the holding rods e.g. by a force fit connection and/or a form fit connection by means of clamps or like. The holding rods additionally allow the lift guard cover to be stabilized in a radial direction.

Preferably, the fastening profile is formed on the lower surface of the carrier and the holding rods are adapted to be attached to the fastening profile from below. This allows a subsequent adaptation of the lift guard cover in the mounted condition on the treatment machine. By installing or removing individual holding rods, the segmentation of the lift guard cover along the carrier can easily be changed and adapted to the respective production conditions. For example, individual circumferential subsegments of the lift guard cover can be removed at locations where a docking station for a treatment unit is to be arranged. At this location, a lift guard cover may then not be necessary or an opening may be provided. In principle, it would also be imaginable to attach the holding rods from below to a fastening profile formed laterally on the carrier.

Preferably, the treatment machine according to the present disclosure further comprises a clamping mechanism for fixing the holding rods on/in the fastening profile, including in particular T-nuts guided in the fastening profile. The holding rods can then be clamped in position e.g. by screwing them into the T-nuts from below. With the aid of the T-nuts, which are displaceable in the fastening profile, the holding rods can be fixed at freely selectable angular positions along the fastening profile.

Preferably, at least one of the holding rods has a telescopic structural design and is variable in length. Protection screens of different heights can then be fixed to the telescopically adjustable holding rods. An area above a dock-on treatment unit may, for example, be provided with an adequately lower protection screen by reducing the length of the holding rods in an adequate manner. Likewise, it would be imaginable that holding rods of different lengths are held available and that individual holding rods are selectively installed in the fastening profile, depending on the respective protection area required.

Preferably, the lift guard cover comprises at least one protection screen configured as a circular arc or a circular ring segment when seen from above. In particular in cooperation with a carrier configured as a circular arc, protection screens can then be positioned in freely selectable angular segments along the carrier. Hence, the lift guard cover can be adapted to different dock-on treatment units in a particularly flexible manner. In addition, the arcuate outline of the lift guard cover has the effect that individual protection screens can more easily be pushed over one another and/or that covers, protection doors or the like can more easily be pushed over protection screens in a vertical direction as well as in a horizontal direction along the carrier. Openings for treatment units and/or for selective access to specific angular segments of the machine can thus be realized easily.

Preferably, the lift guard cover is provided with at least one opening for docking of a treatment unit and with a cover which is displaceable to a position on top of the opening in a vertical or in a circumferential direction. The cover especially allows docking and demounting of treatment units without having to demount individual components of the lift guard cover. For a displacement in a circumferential direction, e.g. horizontally extending rail guides or the like may be provided on the carrier and/or between individual holding rods. Likewise, especially the holding rods may have provided thereon vertically extending rail guides for opening/closing the cover in a vertical direction.

According to an advantageous embodiment of the treatment machine according to the present disclosure, the treatment machine further comprises at least one support plate formed radially outside the container table and used for supporting the lift guard cover at a lowered operating position. The stability of the lift guard cover can thus be increased, especially in the case of treatment machines having a diameter of more than one meter. In particular the areas beside the outer cover plate are then available for docking treatment units in a flexible manner. Since the lift guard cover is primarily used at the lowered operating position and since the mechanical loads occur primarily during the production process, the lift guard cover need not be supported when it occupies a raised maintenance position. Hence, also the constructional outlay for an outer support of the lift guard cover can be minimized in the case of treatment machines with large container table diameters.

Preferably, the treatment machine further comprises a stationary table top having formed thereon a circumferentially extending mounting profile for fixing the support plate. The support plate can then easily be fixed in position at different machine angle positions. In this respect, it will be particularly advantageous to provide a circumferentially continuous mounting profile so that the mounting position of the support plate can be selected freely along the mounting profile.

Preferably, the treatment machine according to the present disclosure is configured as a labeling machine. In the case of labeling machines, the flexible and modular construction principle of the rail guide and of the lift guard cover is particularly advantageous, since it allows the use of different types and/or different numbers of labeling units.

BRIEF DESCRIPTION OF THE DRAWINGS

A preferred embodiment of the apparatus according to the present disclosure is shown in the drawing, in which.

DETAILED DESCRIPTION OF THE PREFERRED EMBODIMENT

Figure 1:
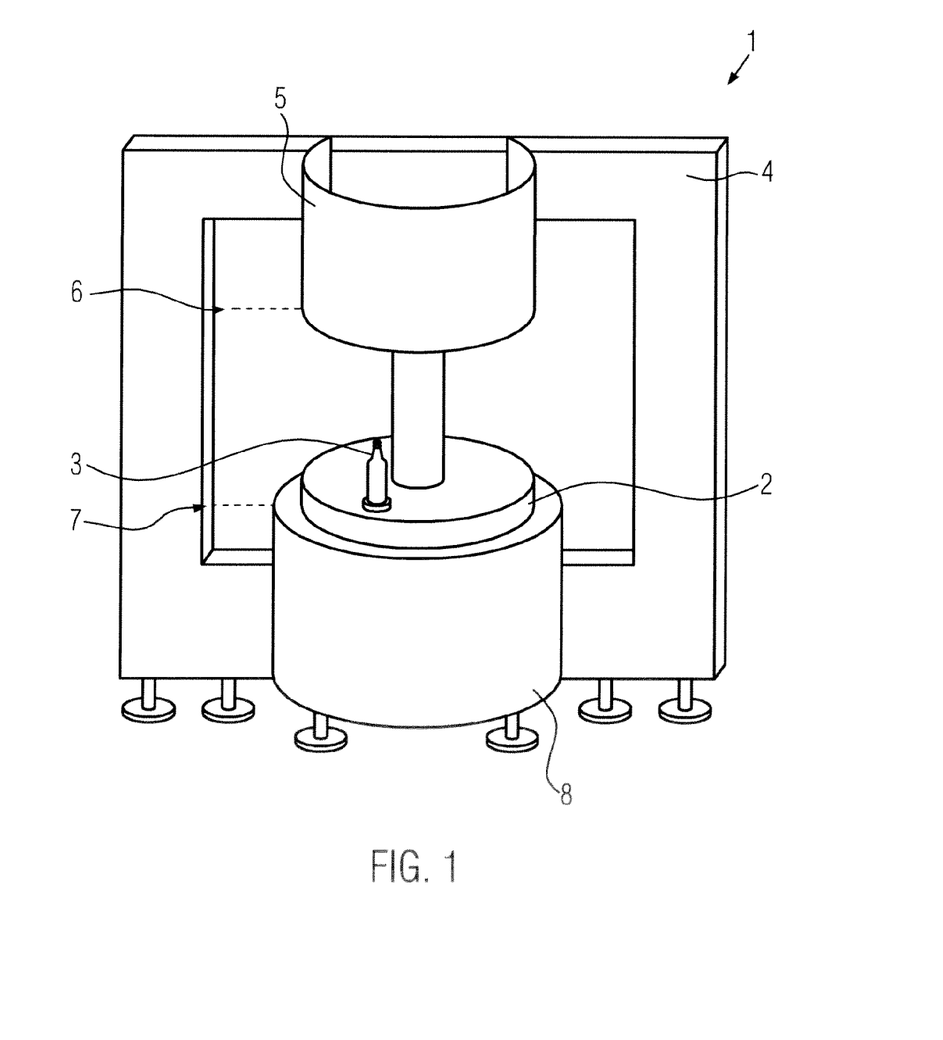
FIG. 1 shows an oblique view of the treatment machine according to the present disclosure in the raised condition of the lift guard cover.

As can be seen in FIG. 1, a preferred embodiment of the treatment machine 1 according to the present disclosure comprises a rotatable container table 2 having, in a manner known per se, provided thereon treatment stations for containers 3, the treatment stations being uniformly distributed over the circumference. Above the container table 2 a stationary frame 4 is provided, which has a lift guard cover 5 secured thereto in a vertically displaceable manner. The lift guard cover 5 is shown in FIG. 1 at a raised maintenance position 6 and occupies a lowered operating position 7 during the regular production process. Below the lift guard cover 5 a machine cover 8 is shown. At the operating position 7, the lift guard cover 5 has preferably been lowered onto the machine cover 8.

Figure 2:
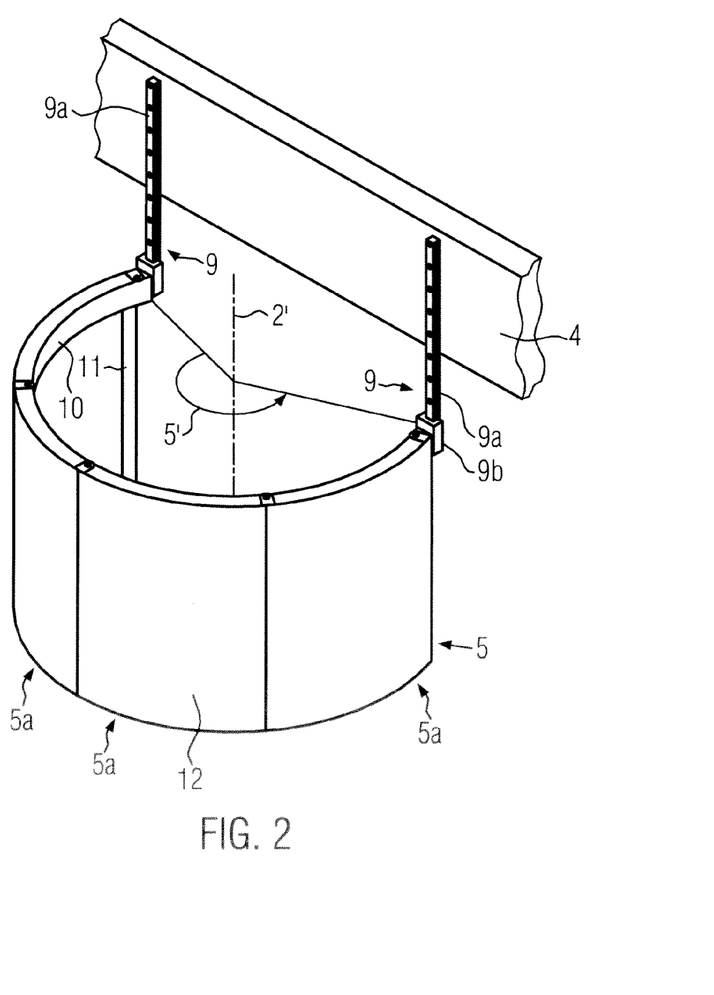
FIG. 2 shows an oblique view of a rail guide and a lift guard cover according to the present disclosure.

FIG. 2 shows a rail guide 9 for the lift guard cover 5. According to FIG. 2, the rail guide 9 comprises stationary guide rails 9a mounted on the upper frame 4 such that their free ends project downwards and fastening elements 9b, e.g. slides or the like, used for fastening the lift guard cover 5 and displaceable along the guide rails 9a. The lift guard cover 5 is preferably of a modular nature and comprises a circumferentially extending carrier 10, holding rods 11 and protection screens 12.

When seen from above, the lift guard cover 5 is configured as a circular arc or a circular ring segment, e.g. over an angular area 5' of the machine of at least 180°, the angular area being related to the axis of rotation 2' of the container table 2. Preferably, a plurality of protection screens 12 are configured as cover elements 5a adjoining one another along the circumference. Each of these cover elements 5a may, by way of example, be held by two holding rods 11 on the lower edge thereof and by the carrier 10 on the upper edge thereof.

Figure 3:
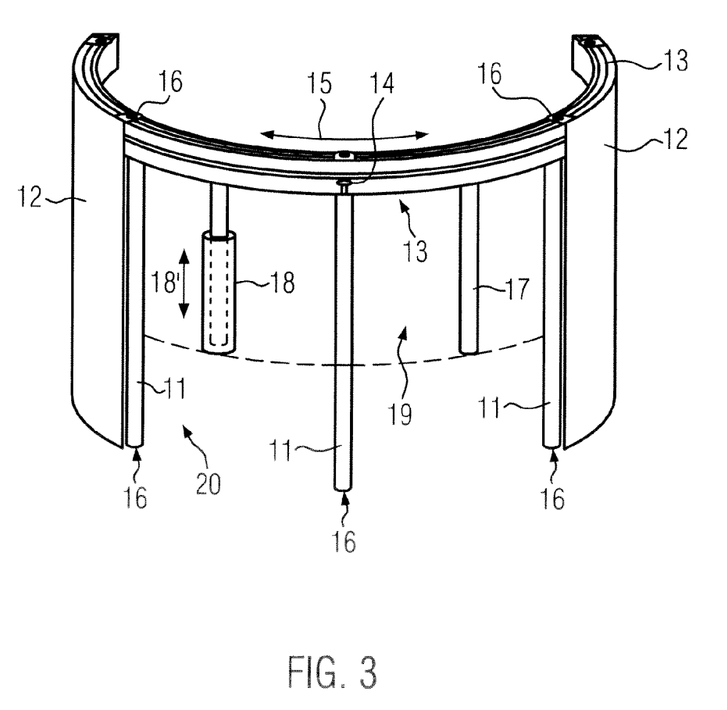
FIG. 3 shows an oblique view of a lift guard cover according to the present disclosure having a modular structural design.

In FIG. 3, the modular structural design of the circular-arc-shaped lift guard cover 5 can be seen. According to FIG. 3, the holding rods 11 are preferably attached to a fastening profile 13 formed on the lower surface of the carrier 10. A corresponding fastening profile 13 configured as a groove is also shown on the upper surface of the carrier 10 for the purpose of illustration. Fastening of the holding rods 11 is preferably accomplished by means of T-nuts 14 which are inserted in the lower fastening profile 13 and which, in a manner known per se, can be screw-fastened to the holding rods 11 that may e.g. be circular in cross-section. By screwing the holding rods 11 into the T-nuts 14, the holding rods 11 can be clamped at positions that are freely selectable in a circumferential direction 15 along the carrier 10. In FIG. 3, the T-nut 14 is indicated only schematically at an imaginary position within the fastening profile 13.

For fixing the protection screens 12, retaining clamps 16 are preferably provided, which are adapted to be screw-fastened e.g. to T-nuts (not shown) guided in the upper fastening profile 13 and which are adapted to be screw-fastened in a corresponding manner to the lower end face of the holding rods 11.

FIG. 3 also schematically indicates holding rods 17, 18 of reduced length by means of which an area 19 of the lift guard cover 5 above an opening 20 can be clamped selectively, the opening 20 serving e.g. as a cutout for a dock-on treatment unit (not shown). Holding rods of reduced length can be realized e.g. by holding available holding rods 17 prefabricated with different lengths and/or by means of holding rods 18 which are telescopically adjustable in length. Telescoping of the holding rods 18 is schematically indicated by the double arrow 18'.

The carrier 10 may also consist of a plurality of arc segments (not shown), which are mounted on one another in the circumferential direction 15, so as to be able to cover, if necessary, different angular segments of the machine by the carrier 10. The fastening profile 13 preferably configured as a continuous profile in the circumferential direction so as to allow holding rods 11 and protection screens 12 to be fixed in freely selectable angular segments of the machine along the carrier 10. The holding rods 11, 17, 18 can be attached to the fastening profile 13 from below and clamped in position by means of a corresponding number of T-nuts 14. The holding rods 11, 17, 18 can thus be installed and dismounted without removing the lift guard 5 from the rail guide 9.

Figure 4:
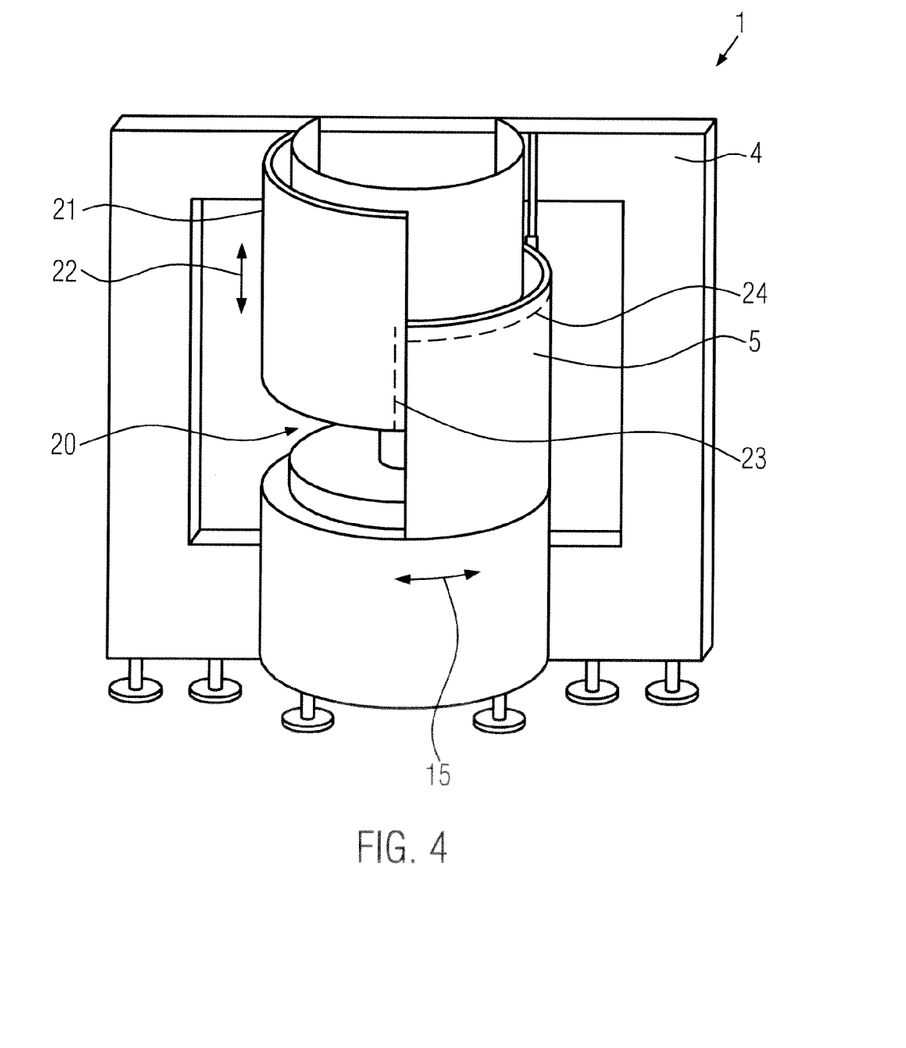
FIG. 4 shows an oblique view of the treatment machine according to the present disclosure, comprising a displaceable cover for an opening for a treatment unit.

FIG. 4 illustrates a displaceable cover 21 for the opening 20. The figure shows a variant in the case of which the cover 21 can be pushed from above over the opening 20 in a vertical direction 22. To this end, the cover 21 is supported, preferably on the outer side of the lift guard cover 5, in a vertically displaceable manner by means of at least one first rail guide 23, which is only schematically outlined. Alternatively, the cover 21 may also be displaced in a horizontal direction 15 along the circumference of the lift guard cover 5. A second rail guide 24 suitable for this purpose is also schematically indicated.

With the aid of the freely projecting guide rails 9a, it can be guaranteed that, when the lift guard cover 5 has been raised, the container table 2 will be accessible throughout a large angular area of the machine. The substantially circular-arc-shaped form of the lift guard cover 5 in a top view allows a flexible arrangement of protection screens 12, cutouts 20 and/or displaceable covers 21 in preferably freely selectable angular areas of the machine. The type and the number of dock-on treatment units can thus be adapted to different production requirements in a flexible manner.

Figure 5:
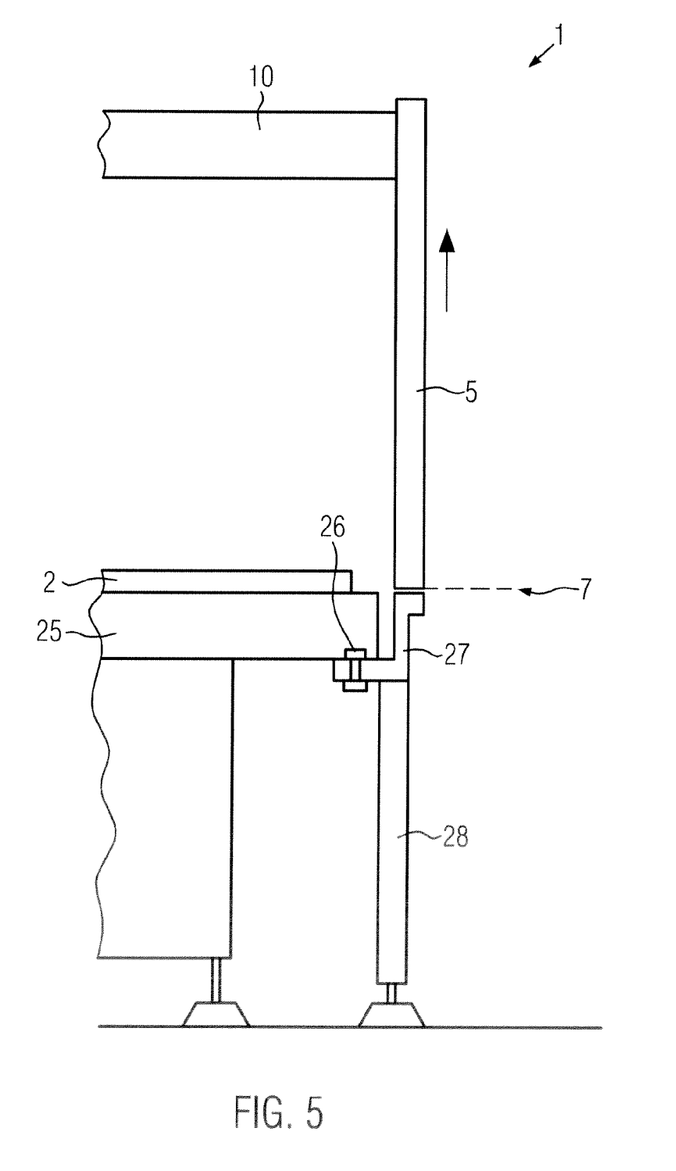
FIG. 5 shows a schematic fragmentary lateral cross-sectional view through the treatment machine according to the present disclosure.

FIG. 5 schematically shows an optional stabilizer/support for the lift guard cover 5 at its lowered operating position 7. Especially in the case of container tables 2 having a diameter of at least 1 m, additional stability can be achieved, when the treatment machine 1 is in operation, by means of an additional stabilizer for the lift guard cover 5 provided radially outside of the container table 2. To this end, a stationary table top 25, by way of example, has formed thereon, e.g. below the container table 2, a circumferentially extending mounting profile 26 to which a support plate 27 for the lift guard cover 5 can clampingly be attached. In addition, a pillar 28 used for supporting the support plate 27 on the floor may be provided.

Since the lift guard cover 5 only has to be raised from the support plate 27 for selected operating steps and/or for the purpose of maintenance, it will normally not be necessary to provide an additional stabilizer for the lift guard cover 5 at the raised maintenance position 6. The stability of the lift guard cover 5 on the treatment machine 1 can thus be increased in a space-saving manner. For example, access to the container table 2 above the support plate 27 will not be impaired.

The support plate 27 can be displaced e.g. along the mounting profile 26, so that it need not be arranged directly below openings 20 for treatment units and so that an almost unhindered fastening of treatment units to the container table 2 and the stationary table top 25, respectively, will be possible. Depending on the number of treatment units provided for the treatment machine 1, a plurality of support plates 27 may be provided along the mounting profile 26 at suitable machine angle positions, i.e. at suitable positions along the circumference of the machine, where they will not or only insignificantly impair the docking of treatment units.

Hence, the fact that the lift guard cover 5 is suspended from the upper rail guide 9 allows, in particular in the case of a contour of the lift guard cover 5 having the shape of a circular arc when seen from above, realization of a particularly flexible machine concept, which guarantees access to the container table 2 for the purpose of operation and/or maintenance of the machine as well as docking of treatment units, such as labeling units, in a manner adapted to different treatment situations. In this respect, the described variants of the lift guard cover 5, in particular the suspended fastening mode of segmented protection screens 12, displaceable covers 21 and the like, can be combined in an arbitrary manner with the suspension of the carrier 10 supported on the upper rail guide 9.

What is claimed is:

1. A treatment machine for containers, comprising:
    a rotatable container table;
    a lift guard cover formed laterally on the container table;
    a rail guide, which is stationarily fixed in position above the container table and which has the lift guard cover secured thereto such that it is displaceable in a vertical direction;
    the lift guard cover comprising a carrier for fastening to the rail guide, the carrier extending in a circumferential direction;
    the rail guide being formed above the container table and comprises guide rails with downwardly projecting free ends;
    at least one support plate formed radially outside the container table and used for supporting the lift guard cover at a lowered operating position; and
    a stationary table top having formed thereon a circumferentially extending mounting profile for fixing the support plate.

2. The treatment machine according to claim 1, wherein the carrier is configured as a circular arc when seen from above, the circular arc enclosing a machine angle of at least 180°.

3. The treatment machine according to claim 1, wherein the lift guard cover comprises protection screens projecting downwards beyond the carrier.

4. The treatment machine according to claim 1, wherein the carrier comprises a circumferentially extending fastening profile.

5. The treatment machine according to claim 4, further comprising holding rods having a first end configured for suspended fastening to the carrier and a second end configured for supporting protection screens thereon.

6. The treatment machine according to claim 5, wherein the fastening profile is formed on the lower surface of the carrier and the holding rods are adapted to be attached to the fastening profile from below.

7. The treatment machine according to claim 6, further comprising a clamping mechanism for fixing the holding rods on/in the fastening profile, including T-nuts guided in the fastening profile.

8. The treatment machine according to claim 5, wherein at least one of the holding rods has a telescopic structural design and is variable in length.

9. The treatment machine according to claim 1, wherein the lift guard cover comprises at least one protection screen configured as a circular arc when seen from above.

10. The treatment machine according to claim 1, wherein the lift guard cover is provided with at least one opening for docking of a treatment unit and with a cover which is displaceable to a position on top of the opening in a vertical or a circumferential direction.

11. The treatment machine according to claim 1, which is configured as a labeling machine.

12. The treatment machine according to claim 1, wherein the containers comprise bottles.

13. The treatment machine according to claim 4, wherein the fastening profile is configured as a groove.

* * * * *